(12) United States Patent
Aytur

(10) Patent No.: US 7,603,084 B2
(45) Date of Patent: Oct. 13, 2009

(54) METHOD AND APPARATUS FOR DC OFFSET CALIBRATION

(75) Inventor: Turgut Aytur, Irvine, CA (US)

(73) Assignee: Wionics Technologies, Inc., Irvine, CA (US)

( * ) Notice: Subject to any disclaimer, the term of this patent is extended or adjusted under 35 U.S.C. 154(b) by 372 days.

(21) Appl. No.: 11/347,817

(22) Filed: Feb. 3, 2006

(65) Prior Publication Data

US 2007/0184803 A1 Aug. 9, 2007

(51) Int. Cl.
*H04B 1/00* (2006.01)

(52) U.S. Cl. ............... 455/63.1; 455/114.2; 455/296; 330/259; 330/270

(58) Field of Classification Search .......... 455/296, 455/424, 425, 456.5, 456.6, 561, 550.1, 575.1, 455/24, 63.18, 501, 67.11, 67.13, 194.2, 455/278.1, 311, 305, 333, 341, 239.1–251.1, 455/253.2, 63.1, 114.2; 327/52, 54, 55, 307, 327/65, 525, 563, 108; 330/253, 254, 261, 330/258, 9, 259, 270, 267
See application file for complete search history.

(56) References Cited

U.S. PATENT DOCUMENTS

| | | | |
|---|---|---|---|
| 4,856,345 A | 8/1989 | Mochizuki | |
| 4,987,327 A * | 1/1991 | Fernandez et al. | 327/543 |
| 6,072,349 A * | 6/2000 | Pippin et al. | 327/307 |
| 6,262,625 B1 * | 7/2001 | Perner et al. | 330/2 |
| 6,307,200 B1 | 10/2001 | Kuhnly et al. | |
| 6,396,343 B2 | 5/2002 | Chee | |
| 6,535,725 B2 * | 3/2003 | Hatcher et al. | 455/317 |
| 6,724,248 B2 | 4/2004 | Llewellyn | |
| 6,914,479 B1 | 7/2005 | Gabillard et al. | |
| 7,039,382 B2 * | 5/2006 | Shu | 455/313 |
| 7,239,199 B1 * | 7/2007 | Chien et al. | 330/9 |
| 2003/0003891 A1 * | 1/2003 | Kivekas et al. | 455/313 |
| 2003/0214423 A1 * | 11/2003 | Lee et al. | 341/118 |
| 2005/0140445 A1 * | 6/2005 | Kim et al. | 330/258 |
| 2005/0285678 A1 * | 12/2005 | Kaviani et al. | 330/261 |
| 2006/0284671 A1 * | 12/2006 | Ohba | 330/9 |
| 2007/0001763 A1 * | 1/2007 | Ju | 330/259 |
| 2007/0159224 A1 * | 7/2007 | Dwarka et al. | 327/175 |

* cited by examiner

Primary Examiner—Duc Nguyen
Assistant Examiner—Charles Chow
(74) Attorney, Agent, or Firm—Tyrean LLC; Thaddeus Gabara

(57) ABSTRACT

A variable amplifier with adjustable current to correct for DC offset. The variable amplifier includes a zero function, allowing for zeroing of some amplifiers in an amplifier chain during correction for DC offset of another amplifier in an amplifier chain. In some embodiments selectable current injection is provided to an amplifier chain in conjunction with signals from selectable mixers.

6 Claims, 6 Drawing Sheets

METHOD AND APPARATUS FOR DC OFFSET CALIBRATION

BACKGROUND

The present invention relates generally to radio frequency (RF) receivers, and more particularly to removal of DC offset in a direct downconversion RF receiver.

In many wireless communication formats no information is provided at DC, and DC offset may not directly corrupt received information. Nevertheless, presence of DC offset may reduce the effective dynamic range of the receiver, and potentially can be sufficiently large that signal processing circuitry is unable to distinguish information in a received message. Accordingly, RF receivers often include circuitry for reducing DC offset.

DC offset may arise from a number of sources. These sources include DC offset caused by mixers and DC offset caused by nonidealities in the baseband amplification stage. DC offset from a mixer can arise, for example, due to leakage from one port of a mixer to another. Often DC offset is most pronounced with respect to leakage of a local oscillator signal, and may vary from receiver to receiver due to random variations in the manufacturing process resulting in different parasitic leakage levels. Similarly, in the baseband amplification stage nonidealities in manufacture and variations of component characteristics with temperature may result in introduction of spurious DC components into a received signal.

Complicating efforts to remove DC offsets, DC offset may be dependent upon operation frequency, level of amplification of the received signal, and temperature, and in many instances RF receivers are required to receive signals over a wide range of frequencies, over a wide range of received signal strengths, and over wide temperature ranges. In addition, some communication formats provide for frequency hopping patterns, with little delay between frequency hops. In some such instances, recalibration or selection of different gain settings between frequency hops may be difficult in the allotted time.

In superheterodyne receivers an intermediated frequency signal may be filtered to reduce DC offset. In direct downconversion receivers, however, filtering of intermediate frequency is generally not available as the signal is generally downconverted directly to baseband. Moreover, the filtering of the intermediate frequency signal is often performed using surface acoustic wave (SAW) filters. However, SAW filters are often relatively large and expensive. Eliminating SAW filters from an RF receiver architecture allows for smaller form factors, lower power consumption and a reduced bill of materials.

SUMMARY OF THE INVENTION

The invention provides method and apparatus for DC offset calibration. In one aspect the invention provides a differential amplifier with DC offset reduction circuitry, comprising a differential amplifier comprising a pair of transistors having their sources coupled to a current source and their drains each coupled to a resistance, differential amplifier adapted to receive a differential input at gates of the pair of transistors; and an adjustable current generator coupled to a drain of one of the transistors of the pair of transistors.

In another aspect the invention provides an amplifier chain including DC offset reduction capability, comprising a plurality of differential amplifiers coupled in series, each of the differential amplifiers having an adjustable current generator coupled to a drain of at least one transistor of a differential transistor pair, and at least some of the differential amplifiers having a circuit path for selectively shunting current away from the differential transistor pair in response to a selection signal.

In another aspect the invention provides a radio frequency (RF) receiver, comprising at least one mixer configured to downconvert an RF signal to a baseband signal; an amplifier chain coupled to the at least one mixer, the amplifier chain comprising a plurality of differential amplifiers coupled in series, each of the differential amplifiers having an adjustable current generator coupled to a drain of at least one transistor of a differential transistor pair, and at least some of the differential amplifiers having a circuit path for selectively shunting current away from the differential transistor pair in response to a selection signal; and processing circuitry configured to command adjustment of the adjustable current generators and to command selectively shunting of current away from the differential transistor pairs.

In another aspect the invention provides a method for reducing DC offset in a radio frequency (RF) receiver, comprising evaluating a signal indicative of an output of a circuit element; and commanding a change in current generation by a current generator associated with the circuit element based on the evaluation of the signal indicative of the circuit element.

In another aspect the invention provides A method of reducing DC offset in a radio frequency (RF) receiver, comprising effectively zeroing inputs to an amplifier in a chain of amplifiers; and commanding a change in current generation by a current generator associated with the amplifier based on a signal indicative of an output of the amplifier.

These and other aspects of the invention are more fully comprehended upon consideration of the drawings and description herein

DETAILED DESCRIPTION

Figure 1:
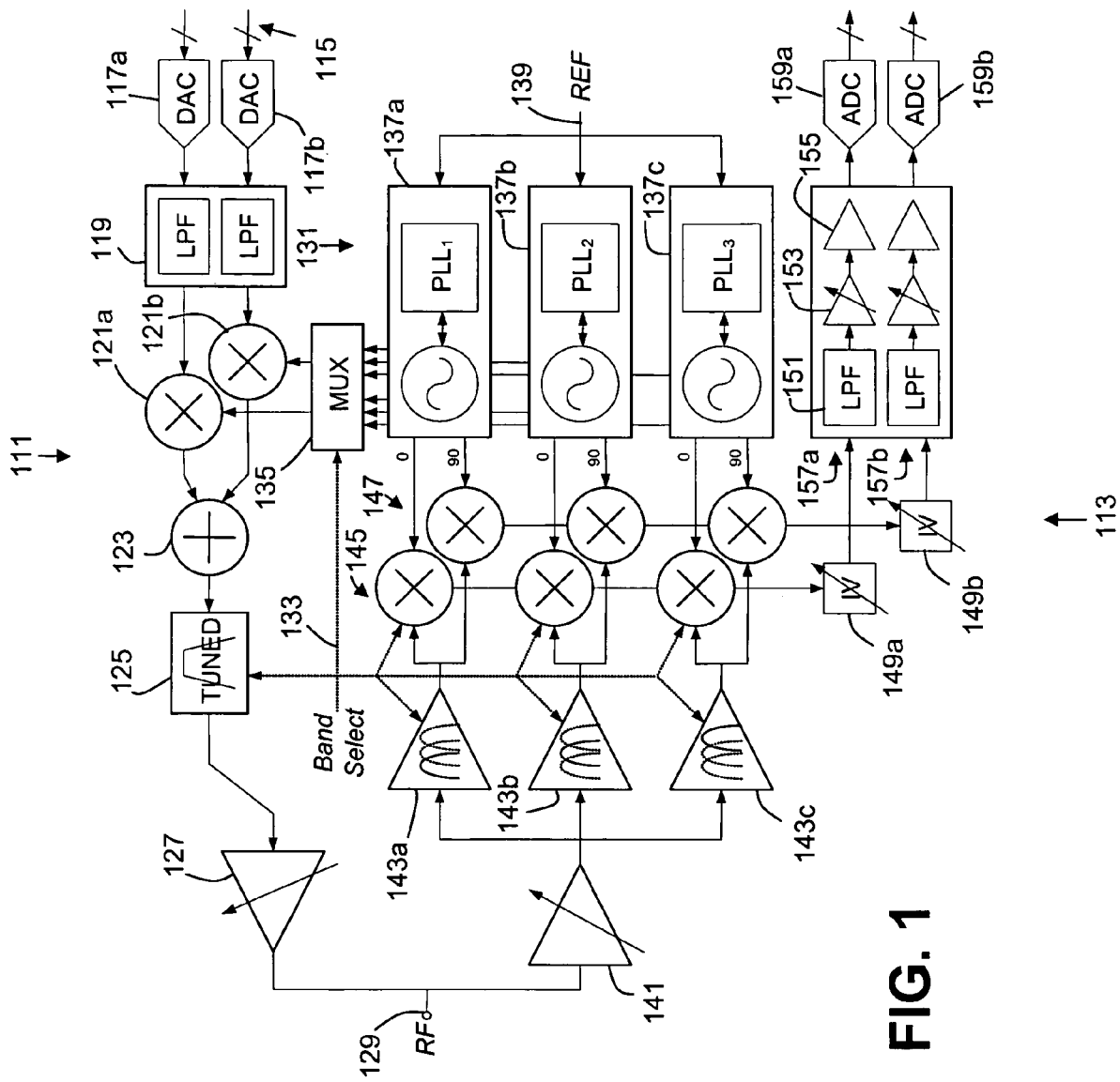
FIG. 1 is a semi-schematic semi-block diagram of a transceiver in accordance with aspects of the invention.

FIG. 1 shows an architecture for an RF transceiver. The RF transceiver includes a transmit chain 111 and a receive chain 113. Both the transmit chain and the receive chain includes circuitry for in-phase and quadrature components. Further, both the transmit chain and the receive chain are band selectable from a plurality of operational frequency bands, with the transmit and receive chains as shown both making use of a plurality of local oscillators, each providing mixing signals about a different frequency.

More particularly, the transmit chain receives analog in-phase and quadrature signals 115. The in-phase and quadrature signals are in digital form, and are converted to analog signals by digital to analog converters (DACs) 117a,b. The analog signals are passed through low pass filters 119 and provided to mixers 121a,b. The mixers mix the analog signals with a mixing signal to upconvert the analog signals, with the upconverted signals summed in a summer 123. The summed signals are passed through a tunable filter 125 and amplified by variable amplifier 127 before being passed to an RF port 129 and an antenna (not shown) coupled to the RF port.

The mixing signals referred to with respect to the transmit chain are provided by local oscillators 131, with particular mixing signals selected using a band select signal 133 and multiplexers 135. As illustrated in FIG. 1, three local oscillators 137a,b,c are used, with the local oscillators generating in phase and quadrature mixing signals based on a reference clock signal 139. Generally the reference clock signal will be at a frequency lower than the frequencies of interest, with the PLLs used to multiply the frequency to desired levels.

Generally, a radio frequency signal received by an antenna is provided to the RF port. A variable amplifier 141, generally a low noise amplifier (LNA), is coupled to the RF port and amplifies the received signal, which is often of a low signal strength.

As illustrated, the receiver portion of the transceiver is configured to process signals over three frequency bands. In operation, a band select signal is provided to components of the receiver portion to provide for processing of received signals of only a single frequency band at a time. The band select signal in various embodiments is the same as the band select signal for the transmit chain, as illustrated for convenience. In many embodiments however, separate band select signals are used for the transmit chain and the receive chain.

Thus, the low noise amplifier provides its output to three frequency dependent amplifiers 143,a,b,c, one of which amplifies the received signal at a given time corresponding to selection of a particular frequency band. Each of the frequency dependent amplifiers provides signals to in-phase mixers 145 and quadrature mixers 147. Each set of mixers is associated with a corresponding one of the band selectable amplifier, and each set of mixers receive mixing signals about different frequency bands from the local oscillators.

The mixers downconvert received signals and provide an in-phase baseband signal and a quadrature baseband signal to current-to-voltage converters 149a,b. In some embodiments the current-to-voltage converters are implemented as part of the mixers, while in other embodiments the current-to-voltage converters may be considered part of an amplifier chain. The current-to-voltage converters provide their respective signals to a portion of the receive chain including low pass filters 151, variable amplifiers 153 and an output signal driver 155. For convenience this portion of the receiver portion, at times including the current-to-voltage converters, is sometimes referred to as an amplifier chain, generally and as shown with separate amplifier chains 157,a,b for each of the in-phase and quadrature signal paths. Analog to digital converters (ADCs) 159a,b receive signals provided by each amplifier chain, and output digital signals for further processing.

The current-to-voltage converter is shown diagrammatically as having an adjustable output, and the amplifier chain is shown as having the low pass filter providing a signal to the variable amplifier, which in turn provides a signal to the output driver. In practice, the current-to-voltage converter often includes amplification characteristics, or possibly discrete amplifiers associated with the current-to-voltage converter, and the amplifier chain may include a number of variable amplifiers and plurality of low pass filters at various locations in the amplifier chain.

Figure 2:
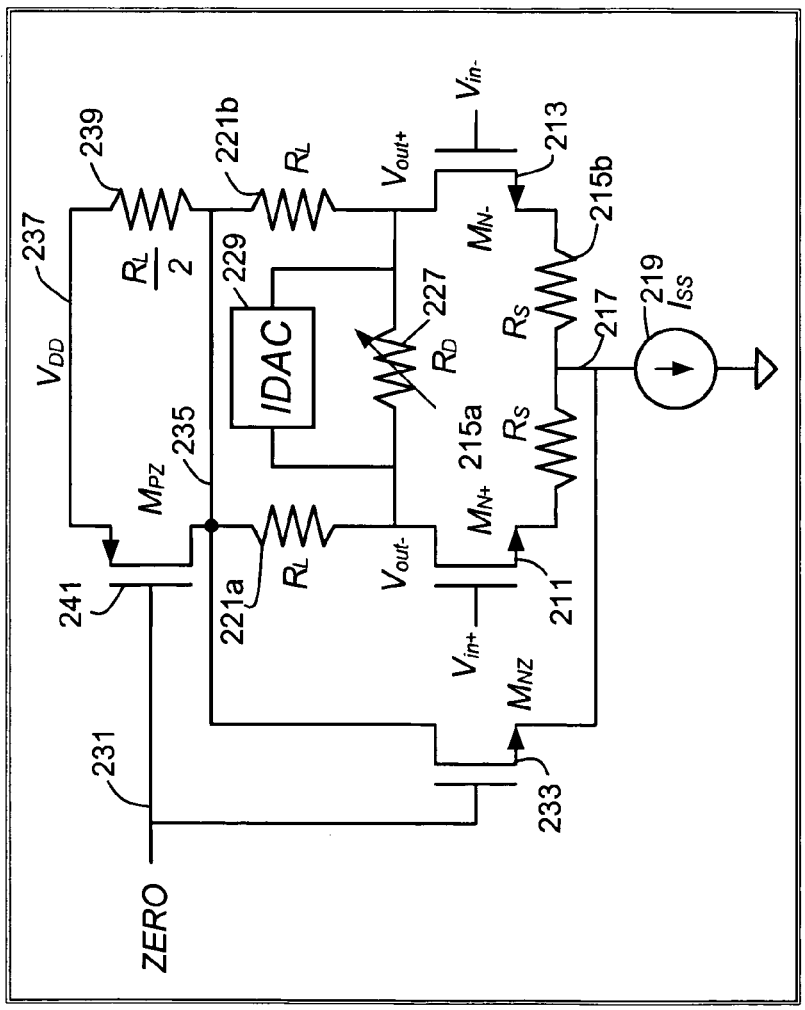
FIG. 2 is a semi-schematic semi-block diagram of a programmable gain amplifier in accordance with aspects of the invention.

FIG. 2 shows a variable amplifier in accordance with aspects of the invention. The variable amplifier includes a zero feature to zero effects of input signals to the variable amplifier and a current injector to reduce DC offset.

As illustrated, the variable amplifier is based on a differential amplifier. The differential amplifier includes a pair of transistors $M_{n+}$ 211 and $M_{n-}$ 213, with differential signal applied to the gates of $M_{n+}$ and $M_{n-}$. Sources of $M_{n+}$ and $M_{n-}$ are connected together through degenerate source resistors $R_s$ 215a,b, with the common node 217 coupled to a current source $I_{ss}$ 219. Drains of $M_{n+}$ and $M_{n-}$ are coupled to load resistors $R_L$ 221a,b, with outputs taken at the drains of the transistors.

The gain of the differential amplifier is variable and the amplifier may be considered a programmable gain amplifier, with the illustrated embodiment including a variable resistor $R_D$ 227 coupling the drains of the transistors. In some embodiments the variable resistor $R_D$ is provided by use of transistors operating in their linear range. However, in most embodiments the variable resistor $R_D$ is provided by a bank of selectable resistances, generally provided by resistors. Resistors in the bank are selectable by a selection signal (not shown), which may be a multibit or multivalued signal. The selection signal causes selected resistors to be coupled between the drains of the transistors $M_{n+}$ and $M_{n-}$. In some embodiments a resistance with a very high resistance is selectable, but in most embodiments an open circuit is also selectable.

During calibration to remove DC offset, discussed below, the variable resistor $R_D$ is preferably set to an open state, such that the resistor $R_D$ essentially has a resistance of infinity. In some embodiments resistor $R_D$ is set to its largest possible resistance value, and in some embodiments resistor $R_D$ is set to a large resistance value. After calibration $R_D$ is set to a desired value to affect the gain of the variable amplifier. In some embodiments, however, a variable amplifier may not be desired, and the variable resistor left out of the circuit.

The amplifier of FIG. 2 also includes an adjustable current generator, preferably a digitally controlled current generator 229. As illustrated in FIG. 2, the digitally controlled current generator comprises a current-mode DAC. In some embodiments the digitally controlled current generator comprises a number of current sources selectable by selection signals. The current generator provides an adjustment current to account, for example, for variations in circuit components, and particularly variations between transistors $M_{n+}$ and $M_{n-}$. As illustrated, the current mode DAC is configured within the circuit to provide current separately to the chains of transmitters $M_{n+}$ and $M_{n-}$. In some embodiments multiple current mode DACs are used.

More particularly, if $R_D$ is set to essentially infinity (namely open) and the load resistors $R_2$ and the transistors $M_{n+}$ and $M_{n-}$ are balanced there should be no output voltage difference when there is no input voltage difference. Often, however, there may be some variations between load resistors and transistors, for example due to manufacturing issues or variations of component characteristics with temperature. Actual component values may be considered as $$R_{L1} = R_L + \Delta R_1$$

$$R_{L2} = R_L + \Delta R_2$$

$$M_1 = M + \Delta M_1$$

$$M_2 = M + \Delta M_2$$

with the delta values indicating differences from the expected values.

In such an instance with no difference in input voltages, the difference in output voltages will be $$V_{-out} - V_{+out} = 2\Delta IR + I(\Delta R_1 \times \Delta R_2) + \Delta I \Delta R_1 + \Delta I \Delta R_2.$$

Ignoring the second order terms $\Delta I \Delta R_1$ and $\Delta I \Delta R_2$, the output voltage difference can be driven to zero by a correction current $$I_{corr} = (2\Delta IR + I(\Delta R1 + \Delta R2))/2R = \Delta I + I(\Delta R_1 + \Delta R_2)/2R.$$

Accordingly, the current generator is configured to provide current to the drain of $M_{n+}$ or $M_{n-}$, and in some embodiments both, as appropriate, thereby decreasing current passing through the respective load resistor and decreasing the appropriate output voltage of $V_{out-}$ or $V_{out+}$.

The variable amplifier of FIG. 2 also includes a means for effectively zeroing the output voltage of the amplifier. In the embodiment of FIG. 2, current is shunted away from $M_{n+}$ and $M_{n-}$ upon application of a zero signal 231, such that current does not flow through their respective load resistors. In various embodiments the current is selectively shunned away from the differential transistors by a circuit path. In the embodiment of FIG. 2 the zero function is performed by a transistor $M_{nz}$ 233 coupled between a common node 235 shared by the load resistors and the common node shared by the degenerate source resistors. More specifically, the gate of transistor $M_{nz}$ receives a zero signal. The drain of transistor $M_{nz}$ is coupled to a common node shared by the load resistors and the source of transistor $M_{nz}$ is coupled to the common node between resistors $R_s$. Application of the zero signal causes current to pass through $M_{nz}$ instead of going through the load resistors $R_L$ and the transistors $M_{n+}$ and $M_{n-}$.

In addition, in the embodiment of FIG. 2, the common node of the load resistors is not directly coupled to $V_{dd}$ 237. Instead, a resistor 239 and a P-channel transistor 241 are coupled in parallel between the common node of the load resistors and $V_{dd}$. The gate of the P-channel transistor receives the zero signal, with the lack of a zero signal allowing the P-channel transistor to conduct. When the zero signal is applied to the gate of the P-channel transistor, the P-channel transistor ceases conduction and the current passes through a resistor sized half the size of the load resistors.

Figure 3:
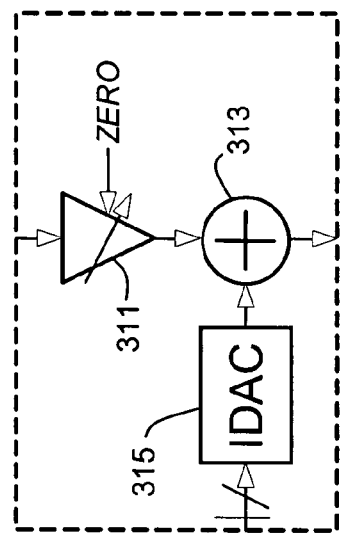
FIG. 3 is a semi-schematic semi-block diagram of a simplified representation of a programmable gain amplifier in accordance with aspects of the invention.

For convenience of further description, the variable amplifier, such as the variable amplifier of FIG. 2, may be considered to be represented by the circuit of FIG. 3. As the variable amplifier of FIG. 3 itself includes a variable amplifier, for convenience the variable amplifier represented by the whole of FIG. 3 will be termed a calibratable amplifier. Such terminology also reflects that the calibratable amplifier need not have an adjustable gain, as the discussion of FIG. 2 indicates.

In the circuit of FIG. 3 a variable amplifier 311 with a zero function receives a signal for amplification. The amplified signal is provided to a summer 313. The summer also receives a signal from a current mode DAC 315, with the current mode DAC receiving a multibit input.

The calibratable amplifier is generally included in an amplifier chain. In operation, assuming the calibratable amplifier is preceded in the chain by other calibratable amplifiers, the preceding calibratable amplifiers in the chain are provided a zero signal, effectively zeroing their outputs. The output of the calibratable amplifier may then be evaluated by processing circuitry (not shown), and the input to the current mode DAC adjusted to reduce DC offsets due to the calibratable amplifier. Moreover, the output of the calibratable amplifier need not be directly evaluated. Instead, for example, an output of the entire amplifier chain may be evaluated, particularly if DC offset reduction has been performed for any subsequent amplifiers in the amplifier chain.

Figure 4:
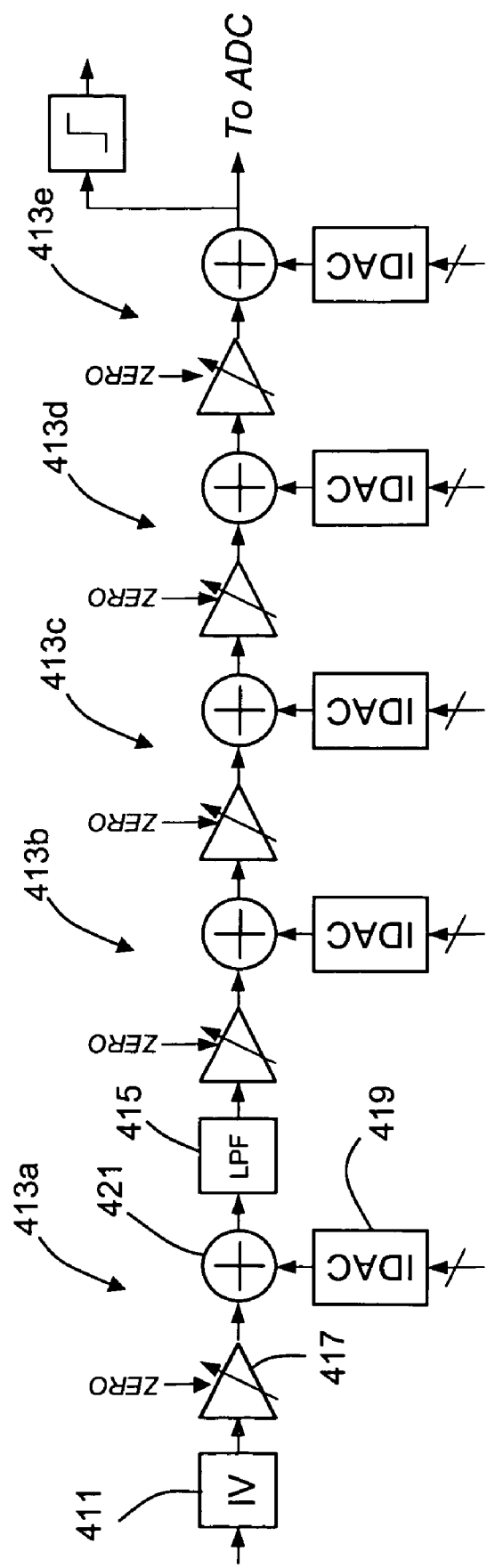
FIG. 4 is a block diagram of an amplifier chain in accordance with aspects of the invention.

FIG. 4 is a block diagram of an amplifier chain in accordance with aspects of the invention. The amplifier chain includes a current-to-voltage converter 411. The current-to-voltage converter receives an input to the amplifier chain, and the output of the current-to-voltage converter is passed to a series of calibratable amplifiers. As illustrated for purposes of example, the amplifier chain includes five calibratable amplifiers 413a-e. Interspersed in the amplifier chain is a low-pass filter 415. In various embodiments different numbers of calibratable amplifiers are used, some or all of which are variable in that they have variable gain, different numbers of low-pass filters are used, and in different locations along the chain. In addition, in various embodiments no zero function is provided for the last calibratable amplifier in the chain. Each calibratable amplifiers is represented by a variable amplifier 415 with zero function, a current DAC 417, and a summer 421 summing the output of the variable amplifier with zero function and current DAC. The output of the variable amplifier chain may be provided, for example, to an analog to digital converter and/or a comparator.

Figure 5:
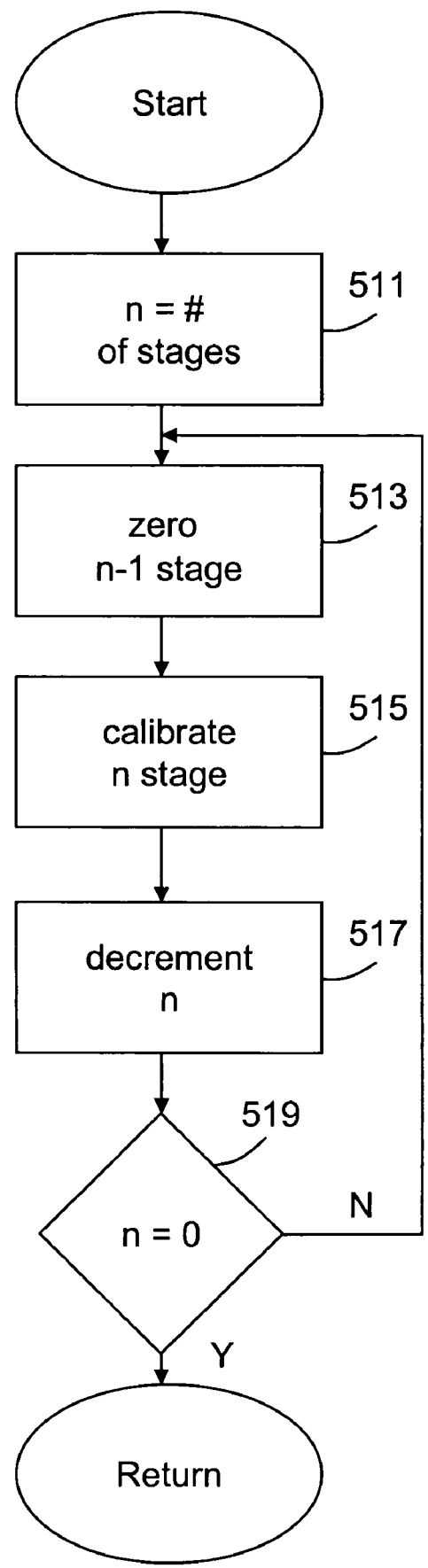
FIG. 5 is a flow diagram of a calibration process in accordance with aspects of the invention.

FIG. 5 is a flow diagram of a process for reducing DC offset in an amplifier chain. In the process of FIG. 5, each amplifier in the amplifier chain is calibrated to reduce DC offset. Preferably, the calibration is performed by sequentially calibrating each variable amplifier in the chain. In one embodiment, calibration begins at the last amplifier in the chain and sequentially calibrates each preceding amplifier in the chain. In block 511 of the process a counter n is set equal to the number of stages in the amplifier chain. Use of the counter n is for convenience of discussion, in various embodiments different mechanisms for looping/iteration may be used. In block 513 the process zeros, or commands zeroing at, the nth−1 stage, and in some embodiments all stages preceding the nth stage are zeroed. In some embodiments zeroing the nth−1 stage is performed by significantly reducing the effects of signal inputs to the variable amplifier comprising the stage, such as accomplished with respect to the embodiment of FIG. 2. In other embodiments the signal inputs to the stage may be swapped with predefined signals, or in some embodiments, such as for differential embodiments, equivalent signals.

In block 515 the process calibrates the nth stage. In some embodiments calibration is performed, for example by processing circuitry, by evaluating output of the nth stage, generating a control signal responsive to the evaluation, and using the control signal to effect a change in stage behavior. In various embodiments this is performed iteratively, until either a preset number of iterations have been performed or a desired characteristic of behavior is achieved. The desired characteristic of behavior may be a zero voltage at the output(s) of the stage, a balanced relationship between outputs for differential outputs, or, in some embodiments, some other characteristic of behavior. In some embodiments the signal evaluated is not necessarily the signal from the stage being calibrated, but instead, for example, an output signal from the amplifier chain may be evaluated instead.

In block 517 the process decrements n. In block 519 the process determines if n equals zero. If n is not equal to zero the process returns to block 513. If n equals zero the process returns.

Figure 6:
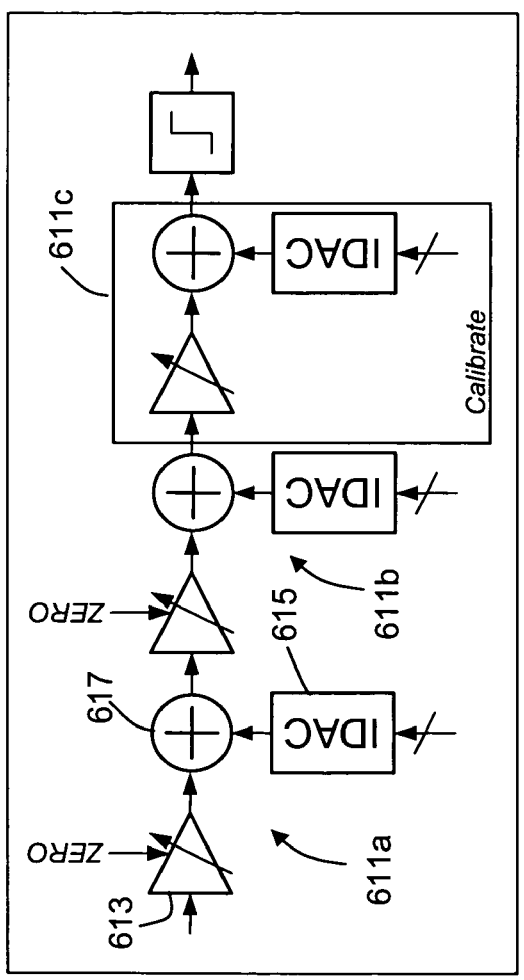
FIG. 6 is a block diagram showing an nth stage undergoing calibration in accordance with aspects of the invention.

FIG. 6 shows an nth stage variable amplifier 611c undergoing calibration. In FIG. 6, three calibratable amplifiers 611a-c are arranged in series, with an output of the last calibratable amplifier provided to a comparator. The calibratable amplifiers each comprise, for purposes of discussion, a zeroable variable amplifier 613 and a current DAC 615 each providing inputs to a summer 617. The calibratable amplifiers are arranged in a series with a first calibratable amplifier 611a, a second calibratable amplifier 611b, and a third calibratable amplifier 611c.

As illustrated in FIG. 6, a zero signal is provided to the first calibratable amplifier and the second calibratable amplifier. Accordingly, the inputs to the third calibratable amplifier are essentially not dependent on variations in the preceding calibratable amplifiers. Thus, any variations in the outputs of the third calibratable amplifier are likely dependent upon DC offset provided by the third calibratable amplifier. The output of the third calibratable amplifier (more specifically the summer as illustrated) is evaluated, and the input to the current mode DAC adjusted in response to the evaluation in an attempt to reduce the DC offset provided by the calibratable amplifier. In some embodiments, this correction process is repeated in an iterative manner to iteratively attempt to calibrate the particular calibratable amplifier. In some embodiments the iteration is set to a predefined number, in some embodiments the iterations are repeated until the output of the variable amplifier is within a predetermined limit, and in some embodiments variations of both are used.

Figure 7:
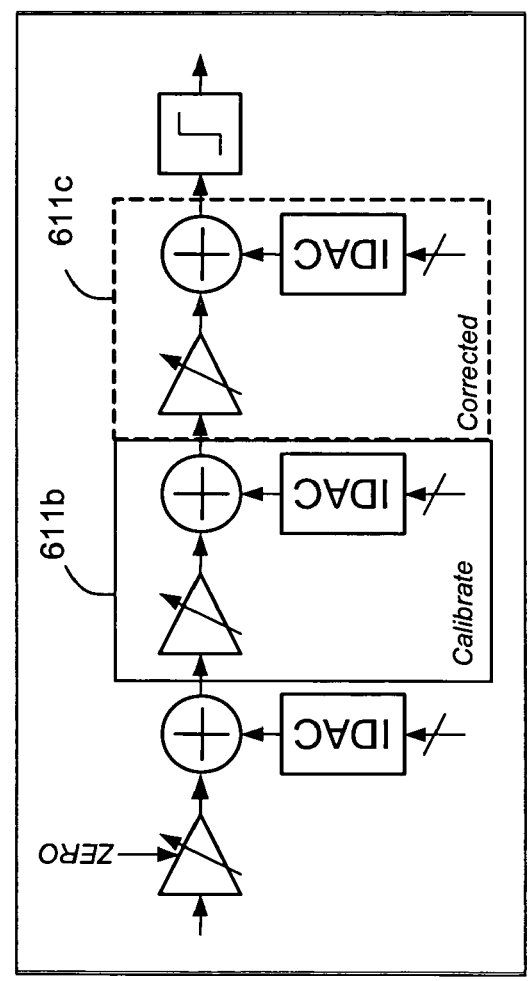
FIG. 7 is a block diagram of an nth–1 stage undergoing calibration in accordance with aspects of the invention.

FIG. 7 shows the amplifier chain of FIG. 6 after DC offset has been corrected for the third calibratable amplifier 611a. In FIG. 7, the second calibratable amplifier 611b is being calibrated, with a zero signal being applied to the first variable amplifier. As the third calibratable variable amplifier has previously been corrected for DC offset, any DC offset should be due to the second calibratable variable amplifier. Finally, the output of the second calibratable variable amplifier, or as shown the output of the amplifier chain, is evaluated and a processor (not shown) or a processing circuitry (not shown) evaluates the output, and adjusts or commands adjustment of the input to the current mode DAC accordingly.

Figure 8:
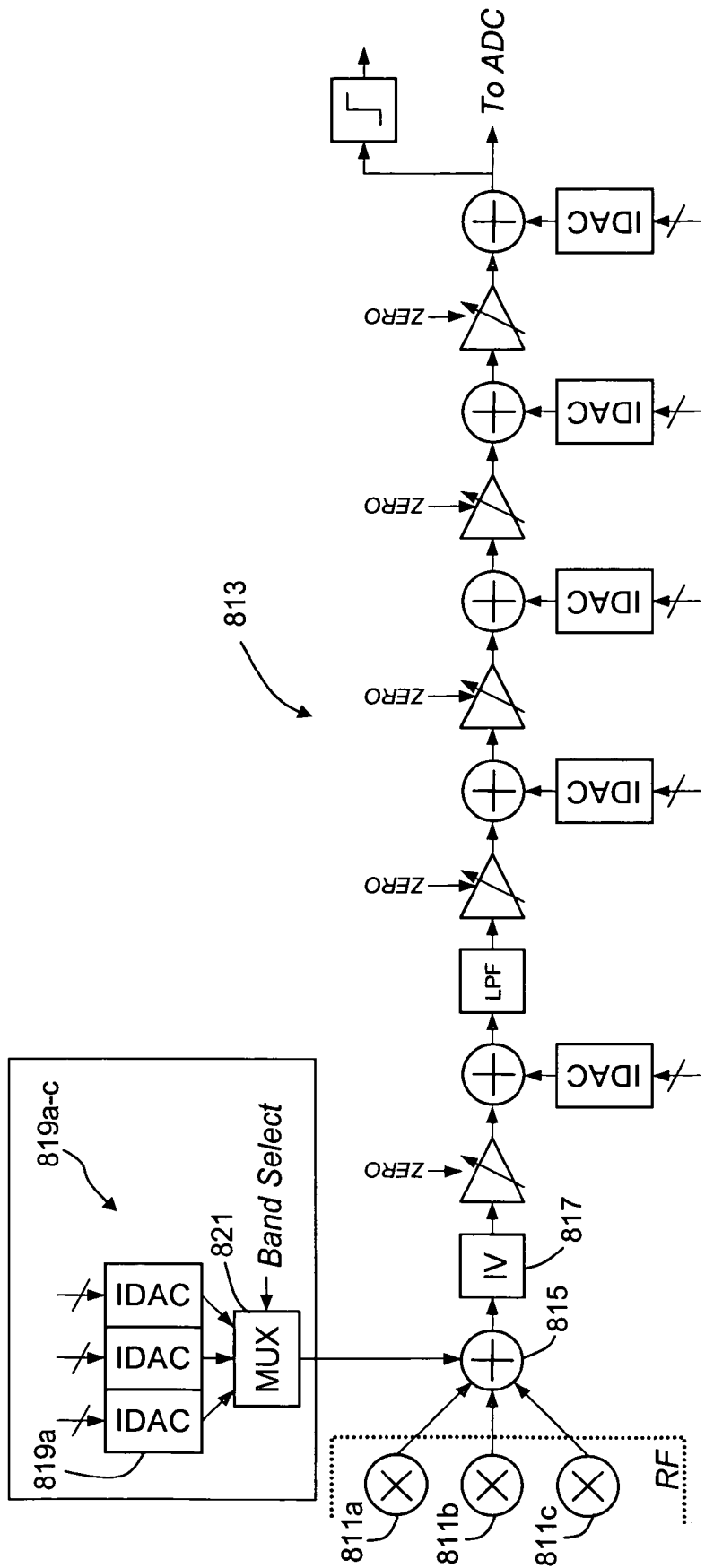
FIG. 8 is a block diagram of a portion of a receiver chain in accordance with aspects of the invention.

FIG. 8 shows a block diagram of a portion of a band selectable receiver including a plurality of selectable mixers 811a-c whose outputs are coupled to an amplifier chain 813. As illustrated, the selectable mixers include three mixers. Each of the mixers receives a mixing signal at a different frequency. In operation, one of the three mixers may be selected for operational use at a given time, and the mixers together may therefore be considered band selectable mixers. Each of the mixers may have different DC offset characteristics for the same frequency, and each of the mixers may have different DC offset characteristics depending on frequency.

The amplifier chain is similar to the amplifier chain previously discussed, with each amplifier in the chain comprising a calibratable amplifier. In some embodiments, after DC offset correction is performed for the amplifier chain, DC offset correction is also performed for the mixers.

In such an embodiment, each of the mixers corresponds to a selectable frequency band, with outputs for non-selected mixers equal to zero, at least ideally. A summer 815 receives the output of the mixers, with the summer providing an output signal to a current-to-voltage converter 817. A band select signal is sequentially set to select each of the different available bands. Thus, when a first band is selected, the output of the first mixer is provided to the summer. As the input chain has previously been calibrated for DC offset, any DC offset at the output of the amplifier chain would largely be expected to be due to the mixer.

Accordingly, the output of the amplifier chain is evaluated, and a control signal is generated in response to the evaluation. The control signal is provided to a first current mode DAC 819a of three current mode DACs 819a-c, one for each mixer. The three current mode DACs provide signals to a current multiplexer 821, which provides a further input to the summer. The summer provides an output to the current-to-voltage converter. Accordingly, adjustment of each DAC allows for reduction of DC offset provided by each mixer.

In many embodiments the current mode DAC does not provide current to a summer external to a mixer. Instead, for example, the current mode DAC provides current to a drain of a transistor within the mixer. In addition, in many embodiments convert-to-voltage conversion also occurs within the mixer.

Further, in many embodiments a single mixer is used to downconvert signals in different frequency bands at different times. In such an embodiment different control signals may be provided to a signal current mode DAC depending on the selected frequency band, or multiple current mode DACs may be used, with a single current mode DAC used for operation with each frequency band.

In various embodiments, a single current mode DAC is used to provide an input to the summer, with the input to the current mode DAC dependent on the band select signal. The input to the current mode DAC is set to reduce the DC offset present at the output of the amplifier chain. In some embodiments, however, the output of the summer, or the current-to-voltage converter, is evaluated instead.

Accordingly, the invention provides a method and apparatus for DC offset correction. Although the invention has been described in certain specific embodiments, it should be recognized that the invention could be practiced other than as specifically described, and that the invention includes the claims supported by this description and insubstantial variations thereof.

What is claimed is:

1. A differential amplifier with DC offset reduction circuitry, comprising:
   a differential amplifier comprising a pair of transistors having their sources coupled to a current source and their drains each coupled to a corresponding resistance, the differential amplifier adapted to receive a differential input between each gate of the pair of transistors;
   an adjustable current generator coupled to a drain of one of the transistors of the pair of transistors; and
   a circuit path configured to selectively shunt current away from the pair of transistors, wherein the circuit path comprises a third transistor coupled between a first and a second node, wherein
   the first node is coupled between $V_{dd}$ and the corresponding resistances coupled to the drains of the pair of transistors, and the second node is coupled between the sources of the pair of transistors and the current source.

2. The differential amplifier with DC offset reduction circuitry of claim 1 wherein the adjustable current generator comprises a current mode digital-to-analog converter (DAC).

3. The differential amplifier with DC offset reduction circuitry of claim 1 further comprising
a fourth transistor coupled between the first node and $V_{dd}$, and a third resistance coupled between the first node and $V_{dd}$.

4. The differential amplifier with DC offset reduction circuitry of claim 1 further comprising an adjustable resistance coupled between drains of the pair of transistors.

5. The differential amplifier with DC offset reduction circuitry of claim 1 further comprising a further current generator coupled to a drain of another of the transistors of the pair of transistors.

6. The differential amplifier with DC offset reduction circuitry of claim 5 wherein the current generator and the further current generator are current mode DACs.

* * * * *